March 4, 1952 — R. R. G. TOUVAY — 2,587,926
PROCESS AND APPARATUS FOR MAKING LENSES
Filed July 31, 1947 — 3 Sheets-Sheet 1
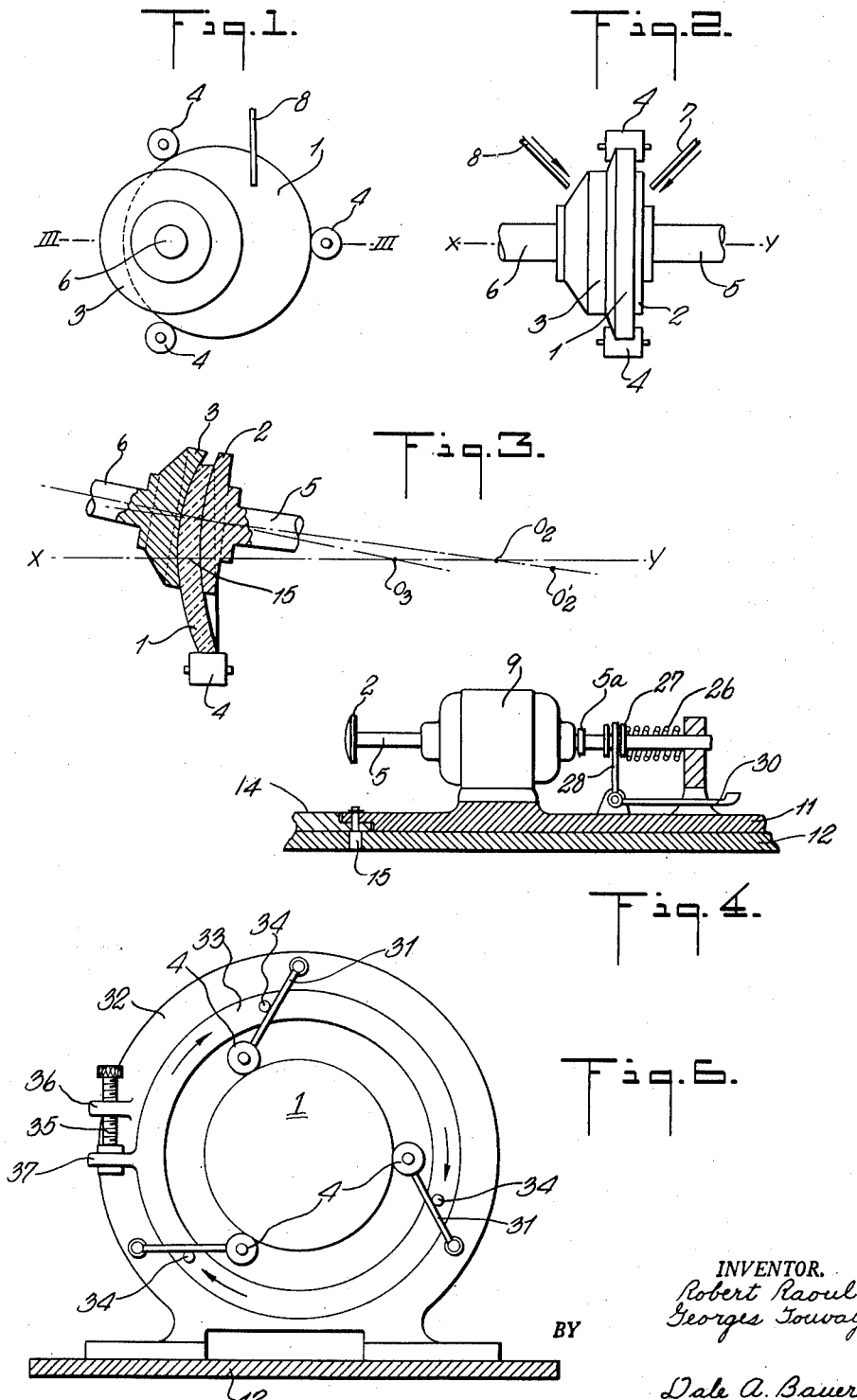
INVENTOR.
Robert Raoul Georges Touvay
BY Dale A. Bauer
ATTORNEY

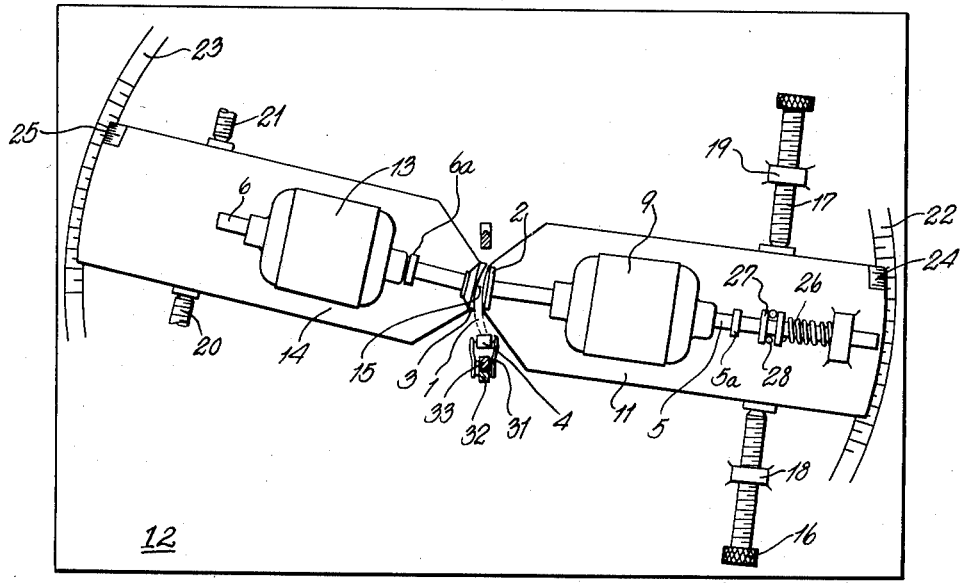
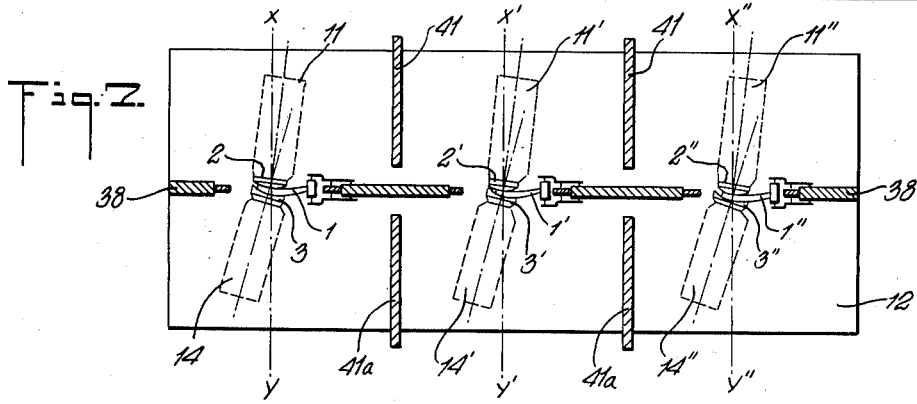
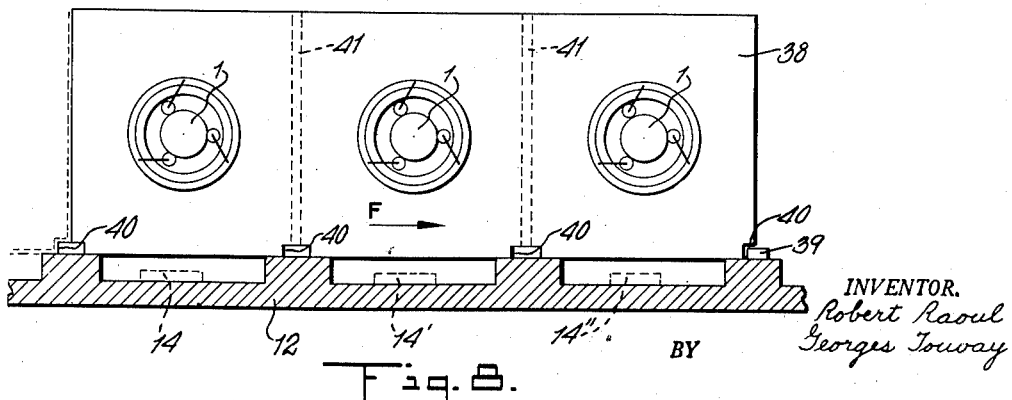

March 4, 1952 R. R. G. TOUVAY 2,587,926
PROCESS AND APPARATUS FOR MAKING LENSES
Filed July 31, 1947 3 Sheets-Sheet 3

INVENTOR.
Robert Raoul
Georges Touvay
BY
Dale A. Bauer
ATTORNEY

Patented Mar. 4, 1952

2,587,926

UNITED STATES PATENT OFFICE 2,587,926

PROCESS AND APPARATUS FOR MAKING LENSES

Robert R. G. Touvay, Paris, France, assignor to Societe Anonyme des Manufactures des Glaces et Produits Chimiques de Saint-Gobain, Chauny & Cirey, Paris, France Application July 31, 1947, Serial No. 765,147
In France November 27, 1945

Section 1, Public Law 690, August 8, 1946
Patent expires November 27, 1965

27 Claims. (Cl. 51—117)

This invention relates to the manufacture of optical glass and particularly to the grinding of lenses. Within the term grinding of lenses is included not only the grinding of curved surfaces but also the production in glass of surfaces having high conformity to a predetermined shape whether that shape be curved or plane.

The working of optical glass includes a wearing down or abrasion, the object of which is to approximate an exact shape delimited, as often as not, by spherical surfaces of selected radius and to polish these surfaces. Within the scope of the present invention it must be understood that by the word "blank" is meant a glass blank or a blank made of any other material transparent or not that is capable of being shaped by working in the apparatus described herein, including not only lenses but mirror surfaces and others which require fine or coarse conformity to a preselected shape.

Heretofore, the working of such a surface was accomplished by sealing the blank on a support and working the free face of the support with a succession of abrasives of different fineness, commencing for instance with sand of relatively large size, continuing with finer and finer sand, and finishing frequently with fine rouge powder to obtain a high polish. After the working of the first face the blank is unsealed, resealed by the finished face, and working proceeds upon the second face as it did upon the first. That method of working includes a series of manual operations and particularly requires that precautions be taken to prevent the first face, the working of which has been completed, from being damaged in the course of working the second face either in the process of sealing it to the support or by the possible contact between it and the coarser abrasives to which the second face is subjected.

Furthermore, the centering of the two faces of the blank with respect to each other, that is, the exact alignment on the axis of the lens of the centers of the spherical sections constituted by the two faces, is apt to be affected by errors made in affixing the finished face to the support. These errors may occur in fixing either face to the support and the possibility of their occurring is greatly magnified by the necessity of remounting the blank.

This invention involves simultaneously working the two faces of a blank by disposing it in a guide that keeps its center aligned with the axis of the guide, while leaving it free to turn on its own axis, and by submitting the blank to the action of two tools which work simultaneously and preferably identically on opposite sides of the blank. The tools are preferably opposed and turn about their axes in the same direction in a location eccentric with respect to the center of the blank. Where the surfaces of the tools are curved, for instance spherical, their axes intersect the axis of the blank from the beginning and remain there throughout the working. The center of such a tool may be upon the guide axis in the beginning or beyond the axis of the guide at the beginning, but should be upon it at the finish of the working. Under these conditions the movement of the tools transmits to the blank a movement about its center. In the course of this movement the blank undergoes a wearing action by the tools and the different parts of its two faces are moved successively into the zone of action of the tools. The absence of any support on the faces of the blank and of any application to the faces except that provided by and for the tools permits the free orientation of the blank between the surfaces of the tools and their wholly uniform action.

A particularly advantageous method of carrying out the invention involves two spherical grinding wheels having dimensions that span a radius of the blank, extending over the center at one side and past the edge to which the radius extends, while leaving the remainder of the blank uncovered. Under such circumstances a particularly even and regular working of the whole surface of the blank occurs. The feeding of the tools with abrasives may be conveniently carried out by projecting the abrasive materials onto the opposed surfaces of the blank, preferably at a point near the tools so that the motion of the blank will carry the abrasives under the tools. It is thus easy to feed the tools continuously with abrasives of selected fineness without touching the tools themselves. When it is desired to wash the faces of the blank, as when a different abrasive is to be employed, the washing can be carried out by spraying water upon the face of the blank without interrupting the action of the tools. This requires only a relatively small amount of water, occurs without seizures, and is distinguished from the prior practice wherein the feeding was not continuous and wherein the blanks were exposed to prejudicial overheating during the periods at which working was interrupted because of the evaporation of the water under the grinder. To avoid this risk the prior art process was carried out during each period of grinding with a large quantity of water in order to have enough water under the tool during the periods between additions of grinding compound. That inconvenience has been overcome by the present invention which permits the use of extremely fine abrasives with relatively little water and which is therefore capable of giving a high degree of polish to the finished lens.

In the drawings, which are largely schematic and wherein like reference characters refer to like parts throughout the several views, Fig. 1 is an end elevational view of an apparatus for grinding lenses constructed in accordance with the principles of the invention;

Fig. 2 is a side elevational view of the apparatus shown in Fig. 1;

Fig. 3 is a horizontal section on the line III—III of Fig. 1;

Fig. 4 is a view partly in vertical section of a part of the apparatus of Fig. 5;

Fig. 5 is a plan view of lens grinding apparatus constructed in accordance with the principles of the invention;

Fig. 6 is a vertical elevation of a satisfactory type of lens holding mechanism;

Fig. 7 is a plan view partly in section of an apparatus for progressively grinding lenses;

Fig. 8 is a vertical elevation of the apparatus shown in Fig. 7;

Figure 10:
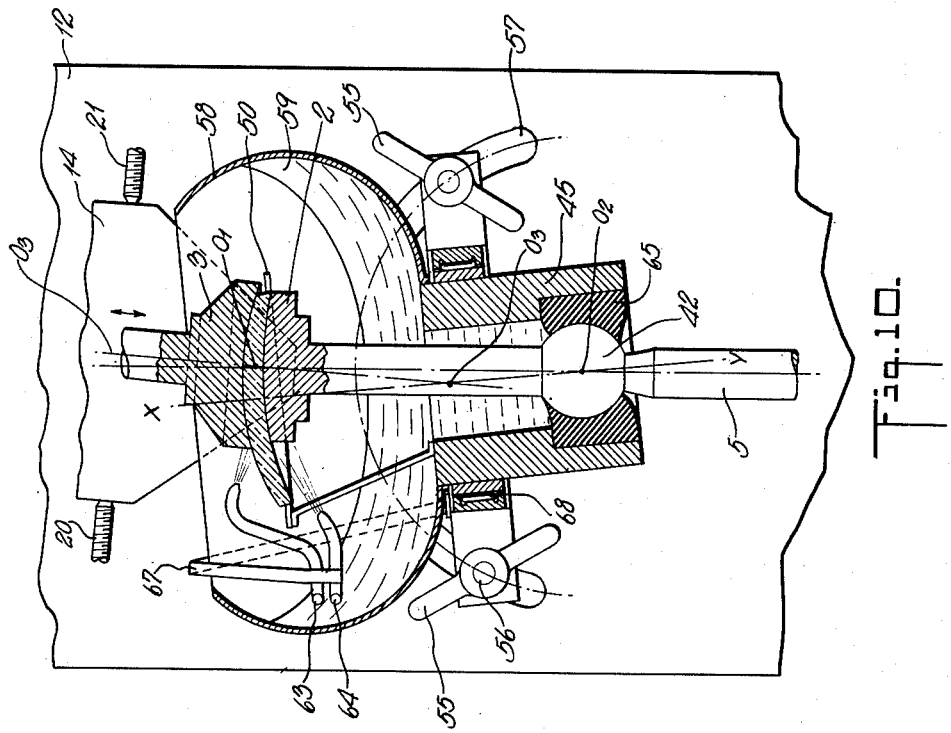
Fig. 10 is a vertical sectional view of a modification of the apparatus shown in Fig. 9.

In the drawings, the numeral 1 indicates the lens blank that is to be worked on both sides by cooperating tools 2 and 3 which are shown as having spherical faces, one of which is concave and the other convex, which are of different radius. The lens blank 1 is spherical and has a cylindrical rim, a form which is preferred because it simplifies procedures in accordance with the invention. The tools 2 and 3 are grinding wheels mounted on power shafts 5 and 6. The wheels have a size which is sufficient to span the radius of the blank and preferably to overlap it somewhat at each end. In working the lens, the tools are rotated in the same direction and are preferably applied with their axes opposed, but not necessarily aligned, on opposite sides of the lens blank. The shafts 5 and 6 are so mounted that they may be axially moved to permit the insertion of the lens blank between them, and their engagement with opposite surfaces of the blank after its insertion. In order to complete a perfect grinding operation, under these circumstances, the lens blank 1 is held true to its own axis by the cylindrical rollers 4, of which three are shown in the drawings, spaced at 120 degrees to each other. When the blank is placed within the rollers its diameter is greater than the distance between any two rollers whose spacing is less than 180 degrees and it will be supported for rotation about an established axis, the direction of which will be determined by the tools 2 and 3. The central axis of the blank is indicated in Figs. 2 and 3 by the dot and dash line XY. The tool 2 is so arranged that its axis $2—O_2—O'_2$ intersects the axis XY. In the structure being particularly described the shaft 6 is supposed to be axially fixed and the shaft 5 is supposed to be axially movable. The tool 2 has an operating face with a radius $2—O_2$. At the start of the grinding operation the position of the center of curvature is at $O'_2$, which is reduced along the axis of the tool until at the finish of the operation it falls upon the axis of the blank XY. The axis $3—O_3$ of the tool 3 intersects the axis XY at the start of the operation and its center of curvature is also on, and remains on, that axis throughout the operation.

The tools 2 and 3 are mounted on shafts 5 and 6 which are angularly movable with respect to each other so that the position of the grinding faces of the tools may be altered to produce lenses of different character.

Once they have been set for the grinding of a particular lens they need not be and preferably are not changed until the grinding has been completed, although an angular change can be made if desired. As the tools 2 and 3 rotate in the same direction upon opposite faces of the lens blank they impart a rotary movement to the blank within the guides 4, and the relative movement of the working surface of the tool with respect to the moving surface of the glass corresponds practically to a movement of translation and obtains the advantages of regularity and perfection that accompany such a movement. In the prior art a movement of translation, or an attempt to obtain such a movement, was procured by displacing the axis of the tool. In the preferred form of the invention, this same result is obtained simply by causing the two grinding wheels and the blank to rotate about fixed axes, permitting the use of mechanical embodiments of simple and balanced kind lacking in the complexity required of prior art devices and susceptible of being worked at high speed to produce superior yields.

Abrasive material to facilitate the grinding is carried by a fluid under pressure through pipes 7 and 8 and sprayed or poured upon the part of the blank that is not covered by the tool. By means of these pipes the identical grinding composition can be used upon both faces of the lens for identical periods of time, to be substituted by another grinding material at will. After grinding with a grinding composition of one degree of coarseness has been completed, pure water or other washing liquid may be projected through tubes 7 and 8 upon the surface of the blank to wash it clean before the next grinding compound is sprayed upon it through the same pipes.

The construction for aligning the tools at the start of the work and for regulating the advance of a grinding wheel is shown particularly in Figs. 3, 4, and 5. Fig. 3 represents the position of the tools at the finish of the grinding operation when the work has been completed and the center of curvature of wheel 2 is on the axis XY at $O_2$. The dot $O'_2$ on the extended axis of the shaft 5 indicates the position of the center of curvature of tool 2 at the start of the grinding operation. The conditions at the start of necessity differ from those at the finish because of the different shape and thickness of the blank.

One of the wheels, for example wheel 3, maintains from start to finish an exact position, that is to say, that the center $O_3$ is on the axis XY. Furthermore, the power shaft 6 is prevented from moving longitudinally by the collar 6a which is fixed with respect to the shaft 6 and rides upon a bearing which is shown at the end of the motor 13 in Fig. 5. On the other hand, the other wheel is movable longitudinally along its axis, the shaft 5 being, however, initially aligned in the direction which it is to maintain throughout the operation, and which is shown in Fig. 3. The shaft 5 is provided with a collar 5a which determines the final position of the wheel 2 by engaging the end of the motor housing 9. Spring 26 bears upon a collar 27 which is fixed to the shaft in a longitudinal sense and exerts a pressure which causes the tool to work at a satisfactory pressure upon the blank. The collar 27 is preferably provided with two flanges between which is located a fork 28 which is pivoted to a pivoted support 11 and is provided with a treadle 30 by means of which the tool 2 may be retracted against the pressure of the spring to permit the insertion of the blank and the removal of the finished lens. The apparatus is provided with a base 12, shown in section in Fig. 4, in which a pin 15 is mounted. Two supports 14, 11 have a common pivot on that pin. The axis of that pivot extends upward through the position of the lens blank, but to one side of its axis. The support has a plurality of screw threaded projections 18, 19 in which screws 16 and 17 are mounted, bearing against the sides of the platform 11. Other screw threaded projections receive the screws 20 and 21 which bear upon opposite sides of the platform or support 14. A circular scale 22, 23, which may be complete or which may be arcs of circles, is provided on the base member 12 and verniers 24, 25 are provided on the pivoted supports 11, 14 so that by this means a most precise angular relation of the axes of the grinding wheels may be achieved. The structure is very simple but very reliable and extremely efficient in operation.

It is important to maintain the circular blank true to its own axis. To accomplish this fixing of the axis I employ a structure of the sort shown in Fig. 6, which allows the blank to adjust itself to the position of the tools without allowing its axis to shift radially once its position has been established.

This device includes a circular frame 32 having a screw threaded lug 36 in which screw 35 is threaded. Within the circular frame is a ring 33 which may be moved arcuately and which has a plurality of pins 34 spaced at less than 180 degrees, of which three are used in the figure. Pivoted to the frame are arms 31 which carry cylindrical rollers 4. The ring 33 has a perforated lug 37 in which the screw 35 is mounted. By turning the screw the lug 37 may be made to turn the ring 33 in the direction of the arrows, making the pins 34 bear on the arms 31, and force the rollers into engagement with the blank 1.

The blank 1 is positioned, at the start of the operation, in engagement with the rollers and the wheel 3, the wheel 2 being retracted by the pedal 30 until this setting is completed, then being released and forced by spring 26 into engagement with the face of the blank opposite wheel 3. Before this engagement is made or the blank is emplaced, the boards 11—14 are set at the angle required to produce a lens of the type desired at the end of the grinding.

This machine may be used to accomplish on one blank the totality of the operations needed to produce a polished product, or it can be used in groups to accomplish portions of these operations, for example for the operations including the use of sand or sandstone. In this case, while leaving the blank in place, the apparatus is served with a selected succession of abrasives of selected coarseness while separating different abrasives by washing to remove the previous. If it is also desired to effectuate the operation of polishing, the tools are changed by replacing the surfaces of iron or abrasives such as "carborundum" which are utilized in the portion of the operation properly called grinding by surfaces of felt. However, it is possible to make, in an advantageous manner, use of an installation in which the several processes are carried out in steps, for each of which a specified apparatus is provided, the blank being moved from one apparatus to the other and being subjected in each to the successive steps that produce a finished product.

In the structure and method illustrated in Figs. 7 and 8, the blank remains throughout the treatment in the same holder and is moved with it between successive pairs of tools. These three figures show three working positions which each blank occupies successively, the movement being indicated by an arrow F in Fig. 8. The operation upon the blanks is carried out simultaneously. Thus, the coarsest grinding may be carried out in the first position, a medium grinding in the second, and a fine grinding in the third. The blanks are mounted in the frame at the left of Figs. 7 and 8 and are moved with the frame successively from position to position toward the right. The common frame 38 in which the blanks are mounted is movable over a series of supports on the base 12, which elevate it sufficiently to pass over the pivoted tool platforms 11—11', etc. In order to fix the position of the frame 38 after each of these displacements, the frame carries abutments 40 which successively engage a corresponding abutment 39 attached to the base 12. The axes of the lens blanks within the lens supports on the frame 38 are identically spaced from each other and the abutments 40 are likewise identically spaced so that as successive abutments 40 engage the abutment 39 the blanks 1 are precisely positioned between successive pairs of grinders. Slidable baffles 41, 41a engage the frame during the time of working, and may be moved away from it to permit the frame to move, and prevent dust or particles from one operation getting into the position where another is being carried out.

The structure of Fig. 7 and the method which it accomplishes are both believed to be new and to represent a material advance in the lens grinding technique. The structure hereinabove described makes it possible to align the tools 11, 11', and 11" as shown in Fig. 7 in identical angular relation to the axis of the blank. The tools carried by the supports 14, 14', 14" have their own precise alignment to the axis of the blank. The tools themselves being of carefully selected contour and the spacing of the abutments 40 exact, each lens is subjected to attack at the precisely correct angles in each position.

Figure 9:
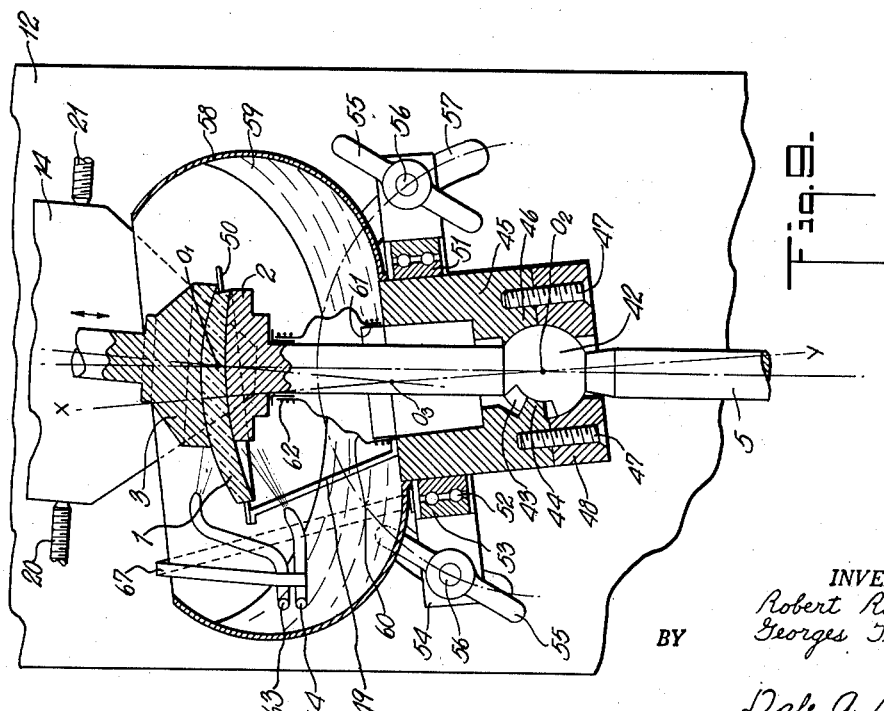
Fig. 9 is a vertical sectional view of a modified form of lens grinding apparatus.

In Figs. 9 and 10 is shown a novel apparatus embodying certain of the principles hereinabove set forth and other new and useful conceptions. In these figures the base 12 is upright, and the supports 11—14 which carry the motors and power shafts have a common pivot which is in relation to the lens blank as hereinabove described. As to the adjustment of the angle of the tools, no difference in principle is involved over what has hereinabove been described. The shaft 5 in these figures terminates in a tool 2 as shown and is provided between its ends with a ball 42 in which is an arcuate groove 43. This ball cooperates with a socket member on the end of the sleeve 45 to serve as a support for a bowl 58. The sleeve 45 has a demi-spherical seat that rests upon the upper portion of the ball 42 and a cap piece 48 is provided with a demi-spherical seat which bears on the lower portion of the ball. The two parts of the socket are held together by screws 47. A prong 44 on the upper portion of the socket enters the arcuate groove 43 and makes contact with its sides, being thereby movable in the arc, but not with respect to the rotary motion, of the ball 42 and shaft 5. Being thus driven by the shaft the socket imparts to the sleeve 45 rotary motion corresponding to that of the shaft while the sleeve is itself angularly adjustable with respect to the axis of the shaft.

Adjustment of the sleeve 45 with respect to the axis of the shaft is accomplished by means of a ball bearing 51 which encircles the sleeve 45 and is itself held within a member 54 having ears which receive bolts 56 having wing nuts 55. The shanks of bolts 56 pass through a slot 57 of base 12 and the heads of the bolts engage the other side of the base. The slot 57 is arcuate, the center of arc being aligned with a horizontal axis through ball 42. Consequently, by loosening the nuts 55 the sleeve 45 may be tilted with respect to the axis of shaft 5 to the extent permitted by the prong 44. Mounted upon sleeve 45 is bowl 58, the mounting of which is liquid tight with respect to the sleeve. A ring 61 is mounted in a liquid tight manner at the upper inner circumference of the sleeve and a similar liquid tight ring 62 engages the shaft 5 below the tool 2. A flexible skirt 60 is mounted on both sleeves in a liquid tight manner.

Also mounted on the sleeve 45 are three braces 49, only one of which is shown, and mounted on the braces 49, is a ring 50, conforming to the circumference of the blank 1, which serves to keep the axis of the blank against lateral displacement. A support 67 carried by the member 54 passes over the rim of the bowl 58 and carries at its end two tubes 63, 64 which have scoop orifices at one end and spray nozzles at the other. The scoop ends of these tubes are close to the wall of the bowl, and the spray nozzles are adjacent to the blank 1 and on opposite sides of it.

In the operation of this structure a fluid abrasive composition 59 is poured into the bowl 58, the tools are rotated upon the blank, and centrifugal force causes the fluid composition 59 to take the centrifugal form shown in the drawing. The tubes 63, 64 receive the moving liquid, and project it upon the surface of the blank by which it is carried under the tools. The abrasive composition 59 is kept by centrifugal motion in a state of suspension and identical grinding proceeds upon the opposite faces of the blank. Scoops of various design can be employed to deflect moving fluid upon the blank.

In Fig. 10 there is a modification of the structure shown in Fig. 9 wherein a pin bearing 68 replaces the ball bearing 52 of Fig. 9 and a circular rubber block 65 forms a liquid tight joint between the ball 42 and the sleeve 45. The sleeve 45 is provided at its lower end with a cylindrical groove in which the block 65 is mounted. The drive of the sleeve 45 and bowl 58 is therefore through the flexible connection 65. This construction makes unnecessary the use of the skirt 60 and its accompanying construction shown in Fig. 9.

These constructions are employed as follows: The sleeve 45 is given the desired inclination with respect to the axis O'O₂ of the grinding wheel 2 and is then fixed in position by the wing nuts 56. Thereafter, the axis O₃ of the upper shaft is oriented so that the axis O₃ intersects the axis XY. The position of the shafts and their attached tools is fixed by screws 20 and 21 as hereinabove described. One of the shafts is then axially displaced in order to place the blank 1 in the ring 50 after which the displaced shaft is raised until its working face contacts the blank. The bowl is provided with a sufficient quantity of liquid abrasive and the apparatus is put in operation. The shaft 5 while rotating the wheel 2 also turns the sleeve 45, the bowl 48 and the guide 50 which is accurately centered on the axis XY. The abrasive mixture is rotated by the bowl, caught by the tubes, and projected upon the opposite faces of the blank. Paddle deflectors could be used to splash the rotating liquid upon the blank.

When the edge of the blank is circular and it is therefore possible to leave the rim free, it is possible to carry out an additional working on the border of the blank while the working of its faces proceeds. For example, a double bevel may be applied to the edge in order to permit its easy mounting in optical apparatus, or other type borders, or to reduce the circumference. These additional operations may be carried out without loss of time by disposing the appropriate tools at one point of the periphery of the blank. The movement of rotation of the blank brings all points of the rim successively against the tool. In order to facilitate this action, the supporting arms 31 may be spring pressed toward the blank so that it is maintained without lateral motion of its axis while its reduction in diameter proceeds.

The invention described is carried out in the same way for an operation requiring the grinding of one face to a plane surface and the other to a spherical surface, no change being required except the substitution of the appropriate tools. This is also true for the preparation of a face of any desired shape. The invention permits the making of optical goods whose nature requires the preparation of opposed faces that are optically plane and when so employed produces such planar goods with high fidelity. In such cases the tools used have flat operating faces mounted in opposite positions in the extremities of the two shafts 5 and 6, the axes of which are both parallel to the axis XY of the guide and may be desirably aligned themselves but eccentric with respect to the axis of the blank. Under these circumstances the axes of the shafts are considered to intersect the axis of the blank at infinity.

Tools of various different shapes may be employed to attain different contours in the goods worked upon. Thus, the tools 2 and 3 might include at their center a recess. By increasing the size of such recesses one constructs tools in the form of annuli, all parts of which work upon the blank with almost equal velocity, whereas in the case of tools having continuous surfaces the velocity of the parts at the center is less than that of the parts at the rim.

It must be undertood that in driving the tools it is possible to use, in place of electric motors, other motors such as water turbines, air turbines, or belt or chain driven shafts. Advantage sometimes comes from using such devices in atmospheres charged with abrasives or humidity.

The invention is equally applicable to the use of tools of various dimensions and for operations upon glass or other optical materials for use in the widest variety of places, for instance in optical goods for telescopes and magnifying glasses, as well as for condenser, spherical mirrors, and Mangin mirrors. The invention is equally applicable to blanks that are of non-circular form because under these conditions it is possible to introduce the blank into a guide which is itself circular as shown, for instance, in Figs. 9 and 10.

The process of the invention produces a great saving in time in the preparation of lenses because the working is carried out simultaneously on both faces of the lens blank, and also because the time heretofore required to seal the lens blank to a support, to unseal it, reverse it and reseal it is eliminated. Furthermore, the lens being polished on both sides at once, danger of cracking the lens by overheating one face while the other remains cool is reduced, because the working of a face creates a considerable temperature which in former cases tended to produce fissures unless carefully controlled. In this invention the lens is heated by simultaneous grinding on both sides so that it attains even temperature and exhibits less tendency to rupture. On the other hand, if one is content to run an equal risk the polishing can be carried out more swiftly than was permissible in the practices of the prior art.

It is particularly notable that the lenses produced have faces that are most precisely and correctly aligned because the form given to the lens results directly from the relative position of the two tools at the end of the working period and the imperfections of alignment heretofore occasioned by the fixing of the lens blank to a support are avoided.

It is possible by this invention to grind both faces identically by polishing for identical periods of time with identical grinding compositions, which dispels all risk of damaging one face by working it with a coarser compound than that which is employed on the other.

Another advantage of the invention is in the working of the two faces of a blank for identical periods with identical materials. The lenses produced by the invention may have their opposite faces precisely aligned and free from displacement, however minor, which is liable to occur with previous methods of manufacture.

As many apparently widely different embodiments of the present invention may be made without departing from the spirit and scope of the invention, it is to be understood that the invention is not limited to the specific embodiments, except as defined in the appended claims.

What is claimed is:

1. The method of making a lens that includes the steps of supporting a blank for rotation true to an axis penetrating the blank, working the opposite sides of the lens blank simultaneously by means of opposed rotors that turn in the same direction about fixed axes which penetrate the blank eccentrically thereof and intersect the extended axis of the blank.

2. The method of making a lens that includes the steps of working the opposite sides of a rotatable lens blank, held true to its own axis simultaneously by means of opposed rotors having fixed axes, during grinding, and diameters somewhat greater than the radius of the blank but materially less than the diameter of the blank that span the radius of the blank and turn in the same direction about axes which intersect the blank and the extended axis of the blank.

3. The method of making a lens that includes the steps of mounting a lens blank for axial rotation, grinding the opposite sides of the blank simultaneously by means of opposed grinding wheels that span the radius of the blank and turn in the same direction about fixed axes which intersect the blank eccentrically and the extended axis of the blank.

4. The method of making a lens that includes the steps of mounting a circular lens blank for axial rotation, imparting translatory motion to the blank and grinding the opposite sides of the blank simultaneously by means of opposed grinding wheels that turn in the same direction about fixed axes both of which intersect the blank, and the extended axis of the blank on one side.

5. Lens making apparatus including means to hold a lens blank for rotation true to an axis penetrating the blank comprising pivotally mounted rollers movable into support of the rotatable lens blank, working tools rotatable in the same direction mounted to engage opposed sides of the blank simultaneously, having axes fixed during grinding extending eccentrically through the blank to intersect the extended axis of the blank on one side thereof, and means to rotate the said tools in the same direction in engagement with opposite sides of the blank.

6. The apparatus of claim 5 in which said tools span a single radius of the blank.

7. Lens making apparatus including a support having pivotal rollers movable into running engagement with the edge of a circular lens blank, rotary grinding wheels mounted to engage opposite sides of the blank and spanning a single radius thereof, means to rotate said wheels in the same direction, said wheels having axes extending eccentrically through the blank to intersect the extended axis of the blank.

8. A lens making machine including a base having an arcuate scale, a pivot pin projecting from the base, two supports having a common pivot at the pin and having indicia cooperating with the scale, screw means to move the supports angularly and to fix their positions, a lens blank holder above the pin, motors carried by the supports having tool carrying power shafts projecting into cooperative lens working position above the pin, one of said shafts being axially fixed and the other being axially movable by a lever against the pressure of a spring.

9. A lens making machine including a base having an arcuate scale, a pivot pin projecting from the base, two supports having a common pivot in the pin and having indicia cooperating with the scale, a lens holder aligned with the pin, tool carrying power shafts projecting into cooperative lens working position, one of said shafts being axially fixed and the other being axially movable and spring pressed toward one shaft.

10. A lens making machine including two supports having a common pivot, a lens blank holder aligned with the pivot, tool carrying power shafts projecting into cooperative lens working position, one of said shafts being axially fixed and the other being axially movable and spring pressed toward said one shaft.

11. A lens making machine including a lens blank holder constructed and arranged to leave both faces of the lens blank exposed, tool carrying power shafts projecting into cooperative lens working position on opposite sides of said holder whereby both sides of the lens blank may be worked simultaneously, said shafts being angularly adjustable with respect to each other about a pivot aligned with the said holder.

12. The machine of the preceding claim in which the shafts carry working tools that span a radius of the lens blank.

13. A lens making machine including a pair of rotary lens working tools constructed and positioned to simultaneously work both sides of a lens blank, means to support a lens blank rotatably between the tools, and means to adjust the angle at which the tools engage a lens blank and to fix the positions of the tools during working.

14. Apparatus for the making of lenses including a frame having more than one lens support, said supports affording access to both sides of lenses held in them, said supports being at identical height in the frame, a base member, said frame and base member having cooperating abutments whereby, upon moving the frame so as to engage different abutments, a lens support will be moved to the identical position from which the motion of the frame removed another lens support.

15. Apparatus for making lenses including lens grinders simultaneously operable on both sides of a lens blank, a frame having supports for a plurality of lenses and a base member slidably carrying the lens supports, said base member and said frame having positioning means cooperating to place succeeding supports in identical lens grinding position before said lens grinder upon motion of said frame with respect to said base.

16. Apparatus for making lenses including a base, pairs of lens grinders, each of which is precisely and identically aligned for grinding simultaneously on opposite sides of a lens and being precisely and identically spaced from each other pair, and a support having lens holders of spacing identical with that of the grinders, and positioning means on the base and the support cooperating to permit the shift of the support and the precise positioning of the lens holders between successive pairs of grinders.

17. The apparatus of the preceding claim in which the lens holders permit the rotation of the lenses between grinders.

18. The apparatus of claim 16 in which the several positions of the grinders are separated by adjustable partitions capable of bearing on the support.

19. Apparatus for the grinding of lenses which includes grinders rotatable simultaneously on opposite sides of a lens blank, lens blank guide means positioned about the space between the grinders, and means to change and fix the angle between the axes of a grinder and the guide.

20. Apparatus for the grinding of lenses including cooperating, opposed grinders, shafts to rotate the grinders, a lens blank guide constructed and arranged to hold a lens blank between the grinders, and means to vary and fix the angle between the axes of the lens blank guide and a grinder.

21. Apparatus for the grinding of lenses including cooperating, opposed grinders, shafts to rotate the grinders, a lens blank guide including a ring constructed and arranged to hold a lens blank between the grinders, a rotatable bowl carried by a shaft, upper and lower pipe sprays adjacent the inner wall of the bowl having open ends to receive fluid rotated by the bowl, and orifices to project such fluid from opposite sides of the blank.

22. In a lens grinding machine a rotatable shaft having a ball between its ends and a lens working tool at one end, a sleeve surrounding said shaft, a rubber joint constituting a liquid tight mount between ball and sleeve, a bowl supported by the sleeve about the lens working tool, a pin bearing engaging the sleeve having projecting ears, a base having an arcuate slot, and hand screws connecting the ears to the base through the slot whereby the sleeve and bowl may be angularly adjusted with respect to the shaft.

23. In a lens grinding machine a rotatable shaft having a ball between its ends and a lens working tool at one end, a sleeve surrounding said shaft, a rubber joint constituting a liquid tight mount between ball and sleeve, a bowl supported by the sleeve about the lens working tool, a bearing engaging the sleeve having projecting ears, a base, and a pin and slot connection between the bearing and the base whereby the sleeve and bowl may be angularly adjusted with respect to the shaft.

24. In a lens grinding machine a rotatable shaft having a lens working tool, a sleeve surrounding the shaft, a joint constituting a liquid tight mount between shaft and sleeve, and a connection permitting angular adjustment of the axes of shaft and sleeve.

25. A lens making machine including a lens blank holder constructed and arranged to leave both faces of the lens blank exposed, tool carrying power shafts projecting into cooperative lens working position on opposite sides of said holder, whereby both sides of the lens blank may be worked simultaneously, said shafts being angularly adjustable to each other about a pivot aligned with the said holder, and carrying working tools being spherical sections of different radius that span a radius of the lens blank.

26. The machine of claim 13 in which the tools span a radius of a blank, rotate in the same direction, and have axes that intersect the blank eccentrically.

27. Apparatus for the grinding of lenses including superimposed, rotary grinders operable from fixed angular positions, means to adjust the angle between the axis of the lens and the axis of a grinder, and means to adjust the angle between the axes of the grinders.

ROBERT R. G. TOUVAY.

REFERENCES CITED

The following references are of record in the file of this patent:

UNITED STATES PATENTS

| Number | Name | Date |
| --- | --- | --- |
| 839,345 | Wagner | Dec. 25, 1906 |
| 1,251,251 | Lindeburg | Dec. 25, 1917 |
| 1,515,681 | Hill | Nov. 18, 1924 |
| 1,610,419 | Brown | Dec. 14, 1926 |
| 1,622,776 | Fisher | Mar. 29, 1927 |
| 1,666,713 | Maynard | Apr. 17, 1928 |
| 1,893,955 | Maynard | Jan. 10, 1933 |
| 1,906,050 | Desenberg | Apr. 25, 1933 |
| 1,995,676 | Gagnon et al. | Mar. 26, 1935 |
| 2,039,852 | Snyder | May 5, 1936 |
| 2,214,361 | Burroughs | Sept. 10, 1940 |
| 2,309,936 | David | Feb. 2, 1943 |
| 2,351,881 | Schottland | June 20, 1944 |
| 2,371,303 | Liebowitz | Mar. 13, 1945 |

OTHER REFERENCES

Amateur Telescope Making, Scientific American Publishing Co., 1926, pages 43 to 46. (Copy in Div. 7.)

Amateur Telescope Making, Munn and Co., 1946, pages 77 to 80. (Copy in Div. 58.)